W. M. HUNT.
Improvement in Wheels for Vehicles.

No. 116,193. Patented June 20, 1871.

Witnesses.
E. F. Kastenhuber
E. Bilhuber.

Inventor.
Willis M. Hunt

UNITED STATES PATENT OFFICE.

WILLIS M. HUNT, OF NEW YORK, N. Y.

IMPROVEMENT IN WHEELS FOR VEHICLES.

Specification forming part of Letters Patent No. 116,193, dated June 20, 1871.

*To all whom it may concern:*

Be it known that I, WILLIS M. HUNT, of the city, county, and State of New York, have invented a new and useful Improvement in Wheels for Vehicles, &c.; and I do hereby declare the following to be a full, clear, and exact description thereof, which will enable those skilled in the art to make and use the same, reference being had to the accompanying drawing forming part of this specification, in which drawing—

Figure 1:
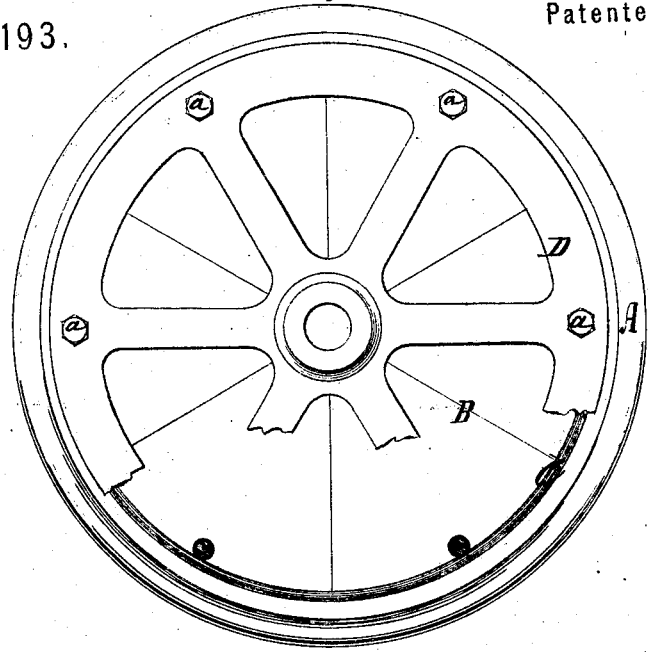
Figure 2:
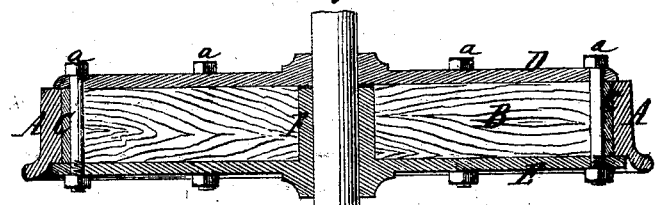
Figure 3:
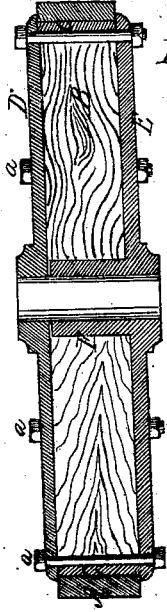

Figure 1 represents a face view of this invention, partly in section. Fig. 2 is a transverse central section of the same. Fig. 3 is a vertical section, with plain tire.

Similar letters indicate corresponding parts.

This invention relates to a wheel composed of a loose tire, a wooden filling-piece, surrounded by an elastic packing-strip or band and fitted nicely into the tire, and two side flanges, which overlap the edges of the tire and are clamped to the wooden filling-piece by means of screw-bolts, which do not pass through the tire, said flanges forming the bearing for the axle of the wheel in such a manner that, by the combined action of the elastic band and the wooden filling-piece, the shocks and blows to which the tire is exposed are intercepted, and a wheel is obtained which runs freely over obstructions, and which proves very economical by saving repairs of the running-gear.

In the drawing, the letter A designates the tire of a wheel, which is made entirely detached from the remaining portions of the wheel. In this tire is fitted a filling-piece, B, by preference made of segmental blocks of wood, and the filling is surrounded by a band, C, of India rubber or other suitable elastic material. Said wooden filling-piece is retained in position by two side flanges, D E, one of which is provided with a hub, F, extending through a hole bored in the wooden filling-piece to receive it. Both these flanges overlap the inner edges of the tire, as shown in the drawing, and they are clamped to the wooden center by screw-bolts $a$, which pass through said flanges and the center without coming in contact with the tire. All thrusts and shocks to which the tire is exposed are intercepted by the elastic band C and the wooden filling-piece B, and a wheel is obtained which runs freely over obstructions, and which, in running over obstructions, does not expose the axle or other parts connected to it to an undue or injurious strain. Furthermore, the tire is free to expand and contract as the temperature changes, and yet it is always held firmly in position.

In Fig. 3 the tire has an uninterrupted tread-surface, by which means the wheel E is adapted to the axles of trucks and other wagons, the construction of the other parts being the same as shown in Figs. 1 and 2.

What I claim as new, and desire to secure by Letters Patent, is—

A wheel composed of a loose tire, A, an elastic band, C, a wooden filling-piece, B, and side flanges D E, clamped to the wooden filling-piece by screw-bolts, which do not come into contact with the tire, all constructed substantially in the manner herein shown and described.

WILLIS M. HUNT.

Witnesses:
W. HAUFF,
L. B. HUNT.